US012597962B2

(12) United States Patent
Kwon et al.

(10) Patent No.: US 12,597,962 B2
(45) Date of Patent: *Apr. 7, 2026

(54) MOBILE DEVICE FOR PERFORMING POWER LINE COMMUNICATION AND OPERATING METHOD THEREOF

(71) Applicant: SAMSUNG ELECTRONICS CO., LTD., Suwon-si (KR)

(72) Inventors: Minkyu Kwon, Hwaseong-si (KR); Guntak Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

This patent is subject to a terminal disclaimer.

(21) Appl. No.: 18/073,133

(22) Filed: Dec. 1, 2022

(65) Prior Publication Data

US 2023/0093939 A1     Mar. 30, 2023

Related U.S. Application Data

(63) Continuation of application No. 17/014,568, filed on Sep. 8, 2020, now Pat. No. 11,552,676.

(30) Foreign Application Priority Data

Feb. 11, 2020 (KR) ........................ 10-2020-0016636
Mar. 11, 2020 (KR) ........................ 10-2020-0030380

(51) Int. Cl.
*H04B 3/54*          (2006.01)
*H02J 7/00*          (2006.01)
(Continued)

(52) U.S. Cl.
CPC ............ *H04B 3/54* (2013.01); *H02J 7/00034* (2020.01); *H02J 7/00712* (2020.01); *H02J 50/80* (2016.02);
(Continued)

(58) Field of Classification Search
CPC .......... H04B 3/54; H04B 3/542; H04B 3/544; H02J 50/80; H02J 7/00034; H02J 7/00712; H04R 1/1016
(Continued)

(56) References Cited

U.S. PATENT DOCUMENTS 4,367,414 A * 1/1983 Miller .................. H05B 47/115
                                                      307/38
5,440,298 A * 8/1995 Kuramatsu ........... H04W 8/245
                                                      340/7.38
(Continued)

FOREIGN PATENT DOCUMENTS

CN          103782559          5/2014
CN          105281444          1/2016
(Continued)

OTHER PUBLICATIONS

Office Action in Chinese Appln. No. 202110127898.9, mailed on Mar. 29, 2024, 18 pages (with English translation).

*Primary Examiner* — Yong Hang Jiang
(74) *Attorney, Agent, or Firm* — Fish & Richardson P.C.

(57) ABSTRACT

A mobile device includes; a power line communication ( ) module that communicates data with an external device via a power line, receives a first preamble signal from the external device during a first preamble interval, receives a voltage signal as the data during a data reception interval following the first preamble interval, and demodulates the voltage signal to provide a demodulated voltage signal, a frequency/duty detector that detects a frequency and a duty of the first preamble signal, and a control circuit that performs signal a data determination operation on a demodulated voltage signal during a data period and using the first detected frequency and the first detected duty.

19 Claims, 10 Drawing Sheets

(51) Int. Cl.
　　*H02J 50/80*　　　　(2016.01)
　　*H04R 1/10*　　　　(2006.01)
(52) U.S. Cl.
　　CPC ........ *H04R 1/1016* (2013.01); *H02J 2207/10*
　　　　　　　　　　　　　　　　(2020.01)
(58) Field of Classification Search
　　USPC ......................................................... 320/149
　　See application file for complete search history.

(56) References Cited

U.S. PATENT DOCUMENTS

| | | | |
|---|---|---|---|
| 6,549,120 B1 | 4/2003 | De Buda | |
| 6,803,790 B2 | 10/2004 | Haycock et al. | |
| 8,861,665 B2 | 10/2014 | Baba | |
| 9,014,305 B2 | 4/2015 | Oettinger | |
| 9,253,122 B1 * | 2/2016 | Zhang .................. | H04L 49/405 |
| 9,325,486 B2 | 4/2016 | Rhelimi et al. | |
| 9,490,965 B2 | 11/2016 | Lee et al. | |
| 9,735,584 B2 | 8/2017 | Taylor et al. | |
| 10,311,010 B2 * | 6/2019 | Kessler ................. | H04B 3/548 |
| 10,498,395 B2 | 12/2019 | Yamashita et al. | |
| 2004/0021510 A1 * | 2/2004 | Takasu ..................... | H03D 3/04 |
| | | | 329/300 |
| 2005/0015805 A1 * | 1/2005 | Iwamura .................. | H04N 7/18 |
| | | | 725/79 |
| 2005/0207383 A1 | 9/2005 | Carsello | |
| 2006/0195629 A1 * | 8/2006 | Sharma .................. | H04L 1/189 |
| | | | 710/30 |
| 2007/0025398 A1 | 2/2007 | Yonge | |
| 2013/0322554 A1 * | 12/2013 | Vijayasankar ........... | H04B 3/54 |
| | | | 375/257 |
| 2014/0093001 A1 * | 4/2014 | Baba ....................... | H04B 3/54 |
| | | | 375/257 |
| 2015/0303741 A1 | 10/2015 | Malik et al. | |
| 2020/0213705 A1 * | 7/2020 | Ding ..................... | A45C 15/00 |
| 2020/0235949 A1 * | 7/2020 | Jones ....................... | H04B 3/54 |

FOREIGN PATENT DOCUMENTS

| | | |
|---|---|---|
| CN | 105637771 | 6/2016 |
| CN | 106233559 | 12/2016 |
| KR | 101558985 | 10/2015 |
| KR | 1020170133858 A | 12/2017 |

* cited by examiner

FIG. 6

CHARGING      CHARGING & COMMUNICATION   CHARGING

VOLTAGE SIGNAL

CHARGING      CHARGING & COMMUNICATION   CHARGING

CURRENT SIGNAL

MOBILE DEVICE FOR PERFORMING POWER LINE COMMUNICATION AND OPERATING METHOD THEREOF

CROSS-REFERENCE TO RELATED APPLICATIONS

This is a Continuation of U.S. patent application Ser. No. 17/014,568, filed Sep. 8, 2020, and a claim of priority is made to Korean Patent Application No. 10-2020-0016636 filed on Feb. 11, 2020, and Korean Patent Application No. 10-2020-0030380 filed on Mar. 11, 2020, the collective subject matter of which is hereby incorporated by reference.

BACKGROUND

The inventive concept relates to mobile devices. More particularly, the inventive concept relates to mobile devices capable of providing power line communication and operating methods for same.

Mobile devices transmit and receive data using a variety of techniques. Power line communication is one technique. However, data transmission and reception by mobile devices using power line communication usually require the use of a phase locked loop (PLL) and corresponding data processing (e.g., phase locking or frequency locking) in order to synchronize the communication of data. Further, data degradation or outright data communication failure may occur during power line communication due to noise associated with the power line.

Accordingly, improvements in the stability of power line communication and the efficient of power line communication are needed.

SUMMARY

Embodiments of the inventive concept provide mobile devices capable of stably transmitting and receiving data using power line communication, as well as operating methods for same.

According to an embodiment of the inventive concept, there is provided a mobile device including; a power line communication (PLC) module configured to communicate data with an external device via a power line, receive a first preamble signal from the external device during a first preamble interval, receive a voltage signal during a data reception interval following the first preamble interval, and demodulate the voltage signal to provide a demodulated voltage signal, a frequency/duty detector configured to detect a frequency and a duty of the first preamble signal, and provide a first detected frequency and a first detected duty, and a control circuit configured to perform a data determination operation on the demodulated voltage signal using the first detected frequency and the first detected duty.

According to an embodiment of the inventive concept, there is provided a mobile device including; a power line communication (PLC) module configured to communicate data with an external device via a power line, receive a preamble signal from the external device during a preamble interval, and receive the data during a data reception interval following the preamble interval, a frequency/duty detector configured to detect a frequency and a duty of the preamble signal and provide a detected frequency and a detected duty, and a control circuit configured to determine the data received from the external device using at least one of the detected frequency and the detected duty, wherein the PLC module is further configured to receive the data in a data period having a rate corresponding to the detected frequency.

According to an embodiment of the inventive concept, there is provided an operating method for a mobile device communicating data with an external device via a power line. The method includes; receiving a first preamble signal from the external device via the power line during a first preamble interval, detecting at least one of a frequency and a duty of the first preamble signal to respectively provide at least one of a first detected frequency and a first detected duty, receiving data from the external device during a data reception interval, and determining the data according to a data period corresponding to the detected frequency and a timing corresponding to the detected duty.

According to an embodiment of the inventive concept, there is provided an operating method for a first mobile device communicating data with a second mobile device connected to the first mobile device via a power line. The method includes; receiving a first preamble signal from the second mobile device during a first preamble interval via the power line, and analyzing the first preamble signal to detect a frequency and a duty of the first preamble signal to provide a detected frequency and a detected duty, setting a data reception frequency according to the detected frequency and setting a data reception timing according to the detected duty, and receiving first data from the second mobile device during a data reception interval following the first preamble interval via the power line using the data reception frequency and the date reception timing.

BRIEF DESCRIPTION OF THE DRAWINGS

Embodiments of the inventive concept will be described hereafter in some additional detail with reference to the accompanying drawings in which:

FIGS. 5 and 6 are respective block diagrams illustrating examples of a mobile system according embodiments of the inventive concept;

DETAILED DESCRIPTION

Hereinafter, embodiments of the inventive concept will be described in some additional detail with reference to the accompanying drawings.

Figure 1:
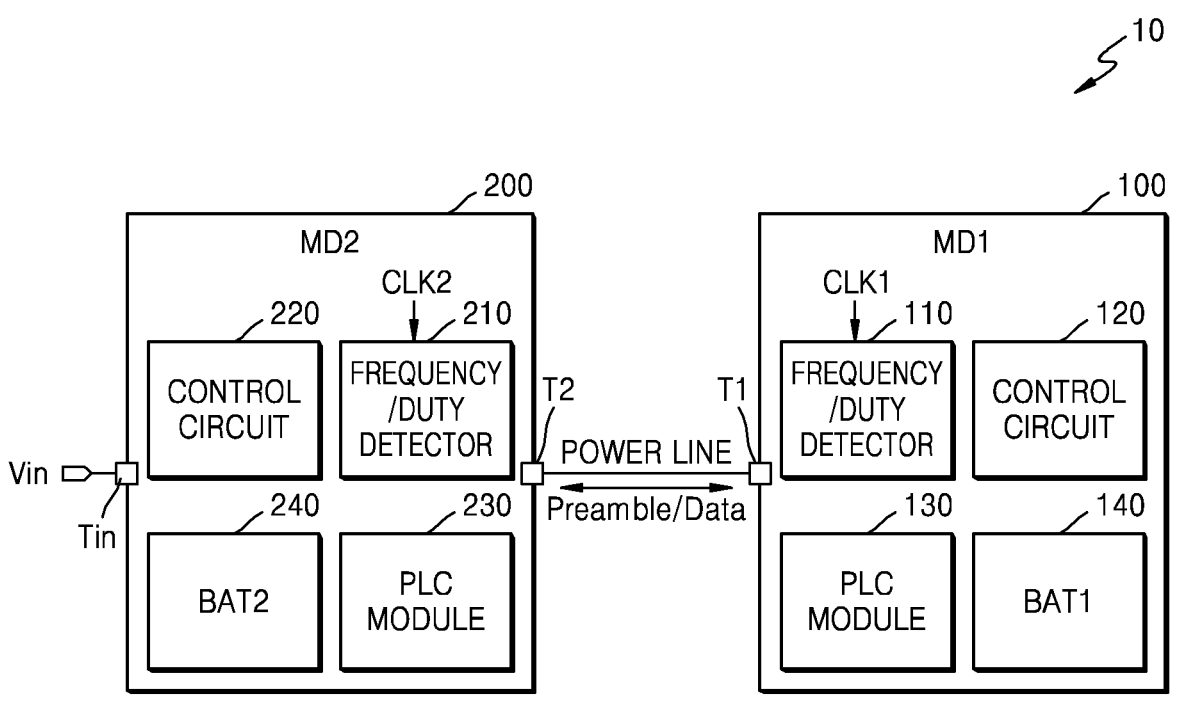
FIG. 1 is a block diagram illustrating a mobile system according to embodiments of the inventive concept.

Figure (FIG. 1 is a block diagram illustrating a mobile system 10 according to embodiments of the inventive concept.

Referring to FIG. 1, the mobile system 10 may generally include a mobile device and an external device. In certain embodiments of the inventive concept, the mobile device may be a first mobile device (MD1) 100 and the external device may be a second mobile device (MD2) 200, where the MD1 100 and the MD2 200 are configured to transmit and/or receive (hereafter, singularly or in combination, "communicate") date and/or provide or receive power via a power line during a power line communication (PLC) operation. In certain embodiments, the MD1 100 may include a first connection terminal T1 electrically connectable to the MD2 200 via a power line in order to receive power from the MD2 200 and/or communicate data with the MD2 200. Likewise, the MD2 200 may include a second connection terminal T2 electrically connectable to the MD1 100 via the power line in order to supply power to the MD1 100 and/or communicate data with the MD1 100.

Thus, in the context of certain embodiments of the inventive concept, PLC operation(s) allow the selective provision of power and/or the selective communication of data between mobile devices using a power line connection. For example, the MD1 100 may communicate data with the MD2 200 through the first connection terminal T1 through which power may also be received from the MD2 200, and/or the MD2 200 may communicate data with the MD1 100 through the second connection terminal T2 through which power may also be received from the MD1 100. Of note, this configuration does not require each mobile device to provide separate connection terminals (e.g., separate connection pins) in order to receive power and communicate data, and the omission of separate connection terminals allows each mobile device to be variously implemented with relatively smaller physical size.

In the illustrated example of FIG. 1, the MD1 100 may include a frequency/duty detector 110, a control circuit 120, a PLC module 130, and a first battery (BAT1) 140. In addition, the MD1 100 may further include an impedance circuit (not shown) connected to the first connection terminal T1, wherein the impedance circuit may be variously designed. Data may be communicated using a signal having a defined voltage swing (hereinafter, "voltage signal") or using a signal having a defined current swing (hereinafter, "current signal") via the power line. In this regard, the voltage/current swing level may be adjusted according to the impedance value of the impedance circuit.

The control circuit 120 may be used to control the overall operation of the MD1 100. For example the control circuit 120 may be used to control: (1) a communication operation during which data is communicated to the MD2 200 under the control of the PLC module 130; and/or (2) a charging operation during which the BAT1 140 is charged by on power received from the MD2 200. In certain embodiments, the control circuit 120 may include a micro control unit (MCU). However, the embodiments of the inventive concept are not limited thereto, and the control circuit 120 may include a processor, a central processing unit (CPU), etc.

The PLC module 130 may receive power from the MD2 200 and/or communicate data with the MD2 200 under control of the control circuit 120. For example, the PLC module 130 may be used to (1) modulate a voltage signal and/or a current signal provided by the MD1 100 at the first connection terminal T1, and/or demodulate a voltage signal and/or a current signal received from the MD2 200 at the first connection terminal T1. For example, assuming that the MD1 100 receives data by demodulating a voltage signal and transmits data by modulating a current signal, the PLC module 130 may include a current source, a current modulator, and a voltage demodulator.

Similar to the foregoing example of the MD1 100, the MD2 200 may include a frequency/duty detector 210, a control circuit 220, a PLC module 230, and a second battery (BAT2) 240. In certain embodiments of the inventive concept, the MD2 200 may further include an input voltage terminal Tin through which an externally generated input voltage Vin (e.g., 5V DC) may be provided. In this regard, the input voltage Vin may be a voltage provided by a charger, a computer, an auxiliary battery, etc.

The control circuit 220 may control the PLC module 230 during a communication operation that communicates data with the MD1 100 and/or during a charging operation that charges the BAT2 240 using the input voltage Vin. The control circuit 220 of the MD2 200 may be substantially similar to the control circuit 120 of MD1 100.

In certain embodiments of the inventive concept, the MD1 100 may be wireless earbuds or wireless earphones, and the MD2 200 may be a wireless charger (e.g., a wireless earbud charger or a wireless earphone charger). Using a PLC operation enabled by an electrical connection between the first and second connection terminals T1 and T2, the MD2 200 (e.g., the earbud charger) may provide power to the MD1 100 (e.g., the wireless earbuds), and/or the MD1 100 and the MD2 200 may communicate data.

Each of the MD1 100 and the MD2 200 may further include a power management integrated circuit (PMIC) (not shown) configured to respectively manage the BAT1 140 and the BAT 240. For example, a PMIC may be used to control various power management operation(s) such as the control or definition of current(s) and/or voltage(s) used during a PLC operation.

In the illustrated example of FIG. 1, the frequency/duty detector 110 may detect a frequency and a duty of a signal communicated via the power line. For example, the MD1 100 and the MD2 200 may operate in a preamble mode during a preamble interval before data is communicated, during which (e.g.,) the MD2 200 may transmit at least one preamble signal to the MD1 100. The frequency/duty detector 110 may detect a frequency and/or a duty of a preamble signal, and provide the resulting detection results to the control circuit 120.

Here, the preamble interval and preamble signal may be variously defined. For example, a preamble interval may include a plurality of intervals, wherein each interval corresponds to one period of the preamble signal. In addition, during each interval in the plurality of intervals, the preamble signal may be toggled at least one time, and the duty of the preamble signal may be detected according to the detection of a toggling width for the preamble signal (e.g., a width (measured in time) of a certain logical state (e.g., "high" or "low) for the toggling preamble signal).

In this regard, the MD2 200 may communicate data with the MD1 100 in accordance with the detected frequency and duty of the preamble signal. For example, data may be communicated between the MD1 100 and MD2 200 during a data interval following the preamble interval according to the same frequency and/or same duty detected in relation to the preamble interval. Thus, when the MD2 200 transmits the data as a voltage signal, the PLC module 130 may generate an internal signal (e.g., a digital signal having logically high or low levels) through a voltage demodulation operation performed on the received voltage signal. Thereafter, the control circuit 120 may determine the received data in accordance with a preset frequency and/or a preset duty for the internal signal.

Those skilled in the art will recognize that the frequency/duty detector 110 may perform the detection operation using a variety of approaches. For example, the frequency/duty detector 110 may detect a frequency and a duty of the preamble signal using a first clock signal CLK1 internally generated by the MD1 100, wherein the first clock signal CLK1 may have a frequency greater than the frequency of the preamble signal. For example, the first clock signal CLK1 may correspond to a limit clock having the highest frequency in the MD1 100 or to a system clock for controlling various circuits in the MD1 100. In certain embodiments, the frequency of the first clock signal CLK1 may have a magnitude that is approximately 20 times the frequency of the preamble signal, and the frequency and the duty of the preamble signal may be detected based on a value obtained by counting the first clock signals CLK1 during one interval in the preamble interval or during a certain logical state (e.g., high or low) of the preamble signal.

In the foregoing manner, the MD1 100 may operate such that data may be received according to a frequency and a duty detected during the preamble interval. For example, information indicating the detected frequency and/or the detected duty may be stored in a storage circuit (not shown) in the MD1 100, and the control circuit 120 may determine data from a voltage signal transmitted via the power line according to a data period and timing corresponding to the stored information. That is, the MD1 100 may receive data during a data period according to a detected frequency and determine timing for the data according to a detected duty.

In certain embodiments, the MD1 100 may transmit data to the MD2 200 using a current signal communicated via the power line according to a current modulation operation. In addition, similar to the embodiment described above, the MD1 100 may transmit a current signal or a voltage signal as a preamble signal during the preamble interval, and the frequency/duty detector 210 of the MD2 200 may detect a frequency and a duty of the preamble signal from the MD1 100 by using a second clock signal CLK2. Thereafter, the MD1 100 may transmit a current signal as data to the MD2 200, and the MD2 200 may determine the data based on the frequency and the duty detected during the preamble interval.

According to certain embodiments of the inventive concept, while performing power provision and/or data communication via a power line connecting mobile devices, a separate clock line—conventionally used for data synchronization—is not necessary. Further, additional circuitry (e.g., a PLL) required for data processing such as phase locking and frequency locking are not required. Nonetheless, a rate and a determination timing of data to be communicated between the mobile devices may be adjusted by adjusting the frequency and duty of a preamble signal. Thus, in certain embodiments of the inventive concept, data communication characteristics may be variously set without the use of such additional circuitry.

The foregoing embodiments assume that the frequency/duty detectors 110 and 210 are separately provided external to the control circuits 120 and 220. However, this need not always be the case and other embodiments of the inventive concept provide the frequency/duty detectors 110 and 210 within the control circuit 120 and 220.

Further, it should be noted that embodiments of the inventive concept may detect a frequency and/or a duty of a preamble signal during a preamble interval.

Figure 2:
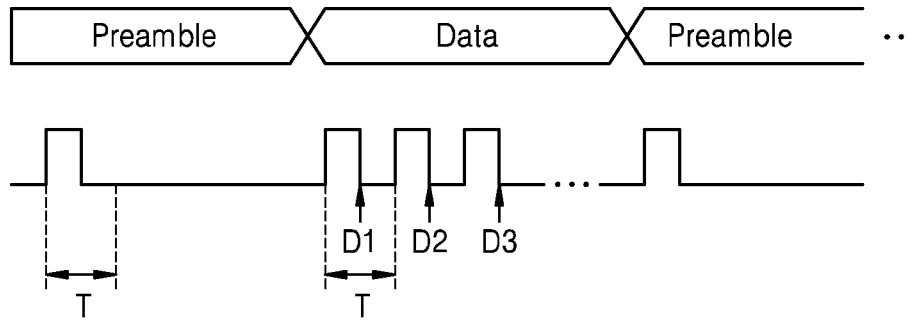
FIGS. 2 and 3 are respective waveform diagrams illustrating a preamble interval and a data interval according to embodiments of the inventive concept.
Figure 3:
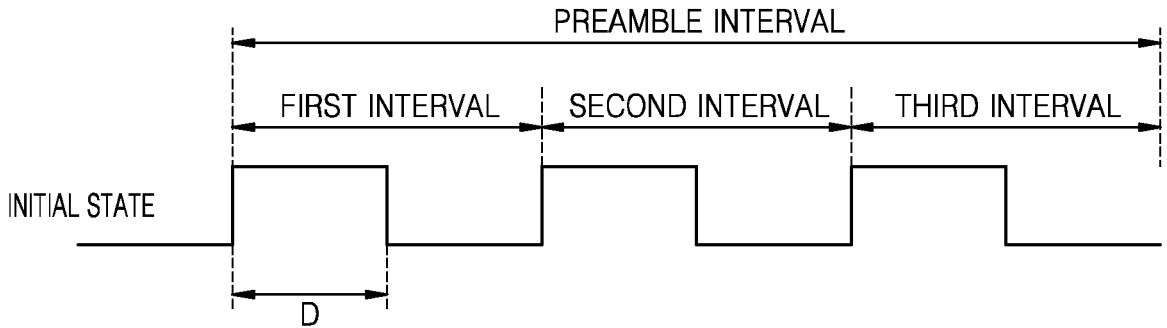

FIG. 2 is a waveform diagram illustrating a sequence of preamble and data intervals, and FIG. 3 is a waveform diagram illustrating in one example a preamble interval according to embodiments of the inventive concept. FIGS. 2 and 3 assume the perspective of a date-receiving mobile device.

Referring to FIG. 2, the mobile device may enter a preamble interval before data is communicated, and accordingly the mobile device may receive a preamble signal toggled at least one time during the preamble interval. FIG. 2 shows an example in which the preamble signal is toggled one time, so that the mobile device may detect a frequency and a duty of the preamble signal.

For example, when a duty ratio for the preamble signal is set to correspond in a 1:1 relationship, a frequency (or period T) of the preamble signal may be detected by detecting a logical high interval or a logical low interval of the preamble signal. The mobile device may perform various configuration operations associated with data reception based on the frequency of the preamble signal, and for example, the period T of the preamble signal corresponds to a data period including one bit in a data transmission interval, and an internal configuration operation may be performed so that data is determined every data period according to the detected frequency.

Thereafter, the mobile device may determine data D1, D2 and D3 based on a preset condition in every data period. For example, a timing (or interval) at which toggling occurs in a voltage signal (or internal signal) during each data period may be set based on the duty of the preamble signal, and when toggling occurs in the voltage signal set during each data period, logically high data may be determined, otherwise, when no toggling occurs in the voltage signal, logically low data may be determined.

FIG. 3 shows an example in which a preamble interval includes a plurality of intervals. Although FIG. 3 shows an example in which the preamble interval includes three (3) intervals and a preamble signal is transmitted in each interval, embodiments of the inventive concept are not limited thereto, and various numbers of preamble signals may be transmitted.

A preamble signal may be communicated to the mobile device via a power line, and a signal applied to the power line before the preamble interval may have an initial state. Thereafter, when the preamble interval starts, a preamble signal may be transmitted in each of a first, second and third intervals, the first, second and third intervals may have the same time interval, and a duty D of each preamble signal may be same. The mobile device may detect a frequency and a duty of a preamble signal received in each of the first, second and third intervals, based on the preamble signal.

The frequency and the duty of the preamble signal may be variously set, and a detection operation thereof may also be performed in various manners. For example, when a preamble signal having the same frequency and duty in each of the first, second and third intervals is transmitted, the frequency and duty of the preamble signal may be detected. Alternatively, at least one of a frequency and a duty of a preamble signal may vary in each of the first, second and third intervals, and the mobile device may detect the frequency and the duty of the preamble signal by calculating average values of frequencies and duties of preamble signals in a plurality of intervals.

One example of an operation capable of transmitting and detecting a preamble signal assumes a mobile device (e.g., MD2) which transmits power that provides a voltage signal as data, wherein a level of the voltage signal to be transmitted through a power line may swing to an appropriate level not to affect an operation of a mobile device (e.g., MD1) which receives the power. The MD2 may perform voltage modulation to provide a preamble signal, and a frequency (or period) of the preamble signal may be lower than a limit clock (e.g., system clock) of the MD1. For example, a frequency of the limit clock of the MD1 may be greater by 20 times than the frequency of the preamble signal Although the initial state before the preamble interval is shown as logical low, embodiments of the inventive concept are not limited thereto, and a preamble signal may be toggled one time in each of a plurality of intervals of the preamble interval. In addition, the MD2 may perform a voltage modulation operation so that duties of preamble signals in the plurality of intervals of the preamble interval are same. The MD1 may analyze a preamble signal by using the limit clock and detect a frequency (or period) and a duty of the preamble signal based on the analysis.

Figure 4:
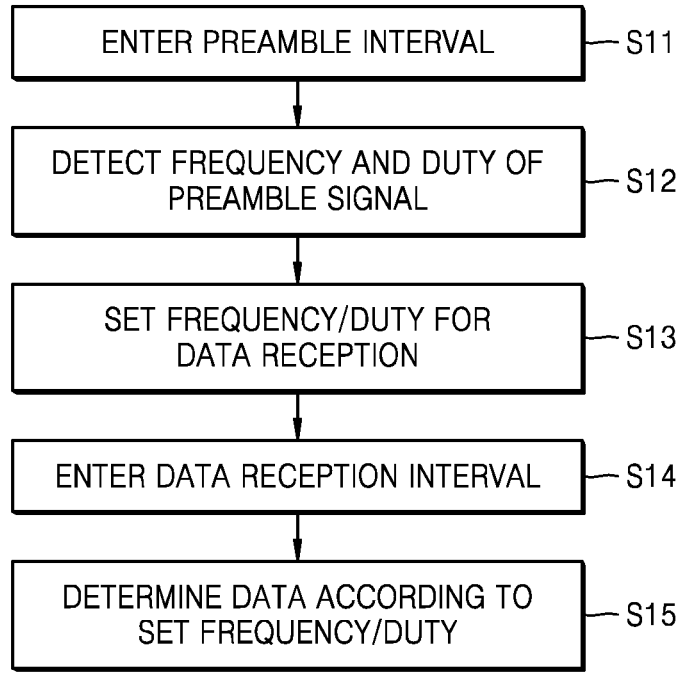
FIG. 4 is a flowchart summarizing in one example an operating method for a mobile device according to embodiments of the inventive concept.

FIG. 4 is a flowchart summarizing in one example an operating method for a mobile device according to embodiments of the inventive concept.

Here, a mobile device may receive power from an external device via a power line, perform a battery charging operation using the received power, and/or communicate data with the external device via the power line through which the power is supplied. To begin, the mobile device enters a preamble interval (S11) which precedes a data interval during which data is received. During the preamble interval the mobile device analyzes at least one preamble signal transmitted during the preamble interval in order to detect a frequency and a duty of the preamble signal (S12).

Various configuration operations associated with data reception in a data transmission interval (or data reception interval) may be performed based on the analysis of the preamble signal during the preamble interval. For example, a frequency and a duty for data reception may be set (S13). Thereafter, the mobile device may enter a data (reception) interval (S14). During the data interval, the mobile device may receive data in accordance with the set frequency and duty (S15). For example, the mobile device may receive data in a data period corresponding to the frequency of the preamble signal, and in addition, the data may be determined according to whether/or toggling occurs in a signal at a timing indicated by the duty of the preamble signal (e.g., timing in one data period).

That is, the mobile device—after detecting the frequency and duty associated with the preamble signal may set (S13) a data reception frequency according to the detected frequency and/or set (S13) a data reception timing according to the detected duty. Then, during a subsequent data reception interval (S14), the first mobile device may receive data from the second mobile device using the previously set data reception frequency and the date reception timing (S15).

Figure 5:
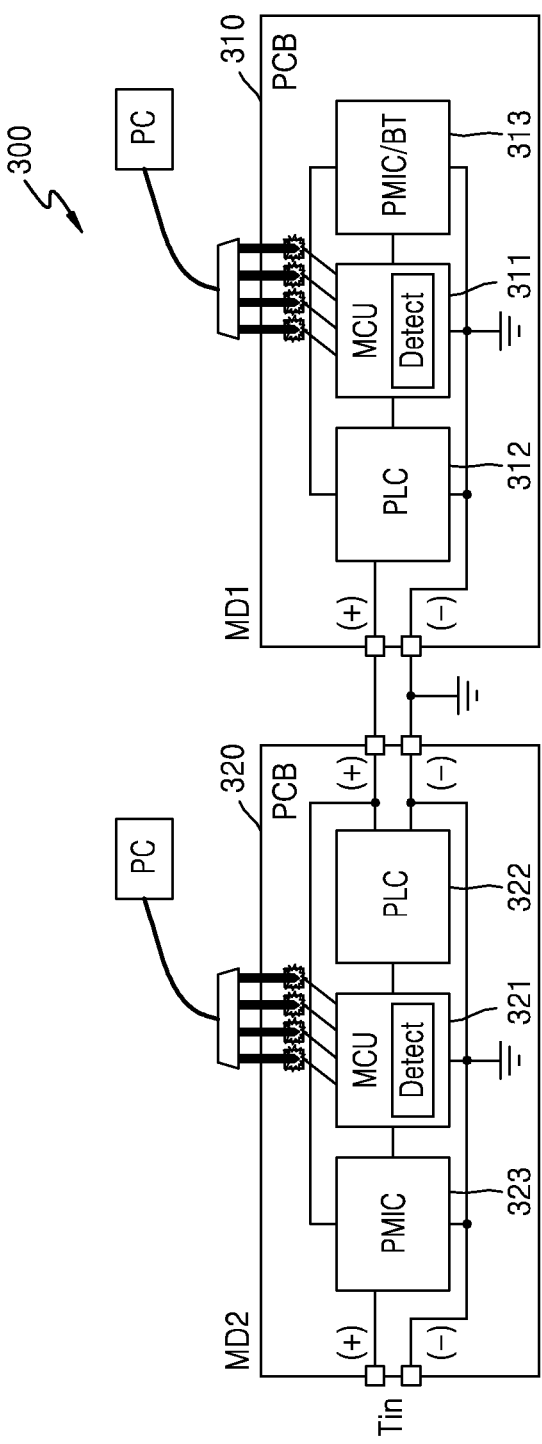

FIG. 5 is a block diagram of a mobile system 300 according to embodiments of the inventive concept. The mobile system 300 may include an MD1 310 and an MD2 320 capable of communicating data using a PLC operation.

According to an embodiment of the inventive concept, the MD1 310 may be wireless earbuds or wireless earphones, and the MD2 320 may be a wireless earbud charger or a wireless earphone charger. The MD2 320 may charge a constituent battery using an external power source connected via an input power terminal Tin. In addition, when the MD1 310 is mounted on the MD2 320, the MD2 320 may transmit, via a power line, power for charging a battery in the MD1 310. In addition, although FIG. 5 shows an example in which the mobile system 300 includes two mobile devices (the MD1 310 and the MD2 320), when two or more sets of wireless earphones are mounted on a wireless earphone charger, the mobile system 300 may include three or more mobile devices.

The MD1 310 may include a PLC module 312 together with an MCU 311 corresponding to a control circuit in the embodiment described above and may further include a PMIC and Bluetooth module 313 as another component. The components described above may be mounted on a printed circuit board (PCB), and although not shown in FIG. 5, the MD1 310 may further include other various components for performing unique functions of the MD1 310.

Likewise, the MD2 320 may include an MCU 321, a PLC module 322, and a PMIC 323, and these components may also be mounted on a PCB. The MD1 310 and the MD2 320 may be connected to each other through one or more terminals, and for example, a voltage signal supplied from the PMIC 323 in the MD2 320 may be provided to the MD1 310 through a first terminal (+) of the MD1 310, and a second terminal (−) of the MD1 310 may be connected to a ground voltage.

Each of the MD1 310 and the MD2 320 may further include additional terminals for connection with an external host (e.g., a smartphone or a personal computer (PC)), and transmit and receive various kinds of information by communicating with the host through the additional terminals. For example, each of the MD1 310 and the MD2 320 may receive firmware from the host and process an internal operation according to the firmware, and a Bluetooth module in the MD1 310 may receive firmware from the host through wireless communication such as Bluetooth communication.

In addition, the MD1 310 may provide the received firmware to the MD2 320 through data communication, and similarly, the MD2 320 may provide firmware received from the host to the MD1 310 through data communication. When a partial integrated circuit (IC) fails after shipping the MD1 310, the MD1 310 may repair the failure of the IC using the firmware received from the MD2 320.

The PMIC 323 in the MD2 320 may control an operation that charges the battery in the MD2 320 and may also provide power via the power line for data communication. In addition, the PLC module 322 in the MD2 320 may perform a voltage modulation operation using power of the PMIC 323 for data communication, and according to the embodiments described above, the MD1 310 may determine data through a voltage demodulation operation. Likewise, the PLC module 312 in the MD1 310 may transmit data to the MD2 320 by performing a voltage demodulation operation using power of the PMIC 313 for data communication, and for example, the MD1 310 may adjust a level of a load current to be consumed in the inside thereof, thereby providing a current signal of which a level is adjusted. In addition, according to the embodiments described above, the MD2 320 may determine the data through a current demodulation operation.

In the illustrated example of FIG. 5, a component configured to detect a frequency and a duty of a preamble signal may be included in a control circuit. For example, the MD1 310 may include a frequency/duty detection circuit 311_1 to detect a frequency and a duty of a preamble signal from the MD2 320, and likewise, the MD2 320 may include a frequency/duty detection circuit 321_1 to detect a frequency and a duty of a preamble signal from the MD1 310.

Figure 6:
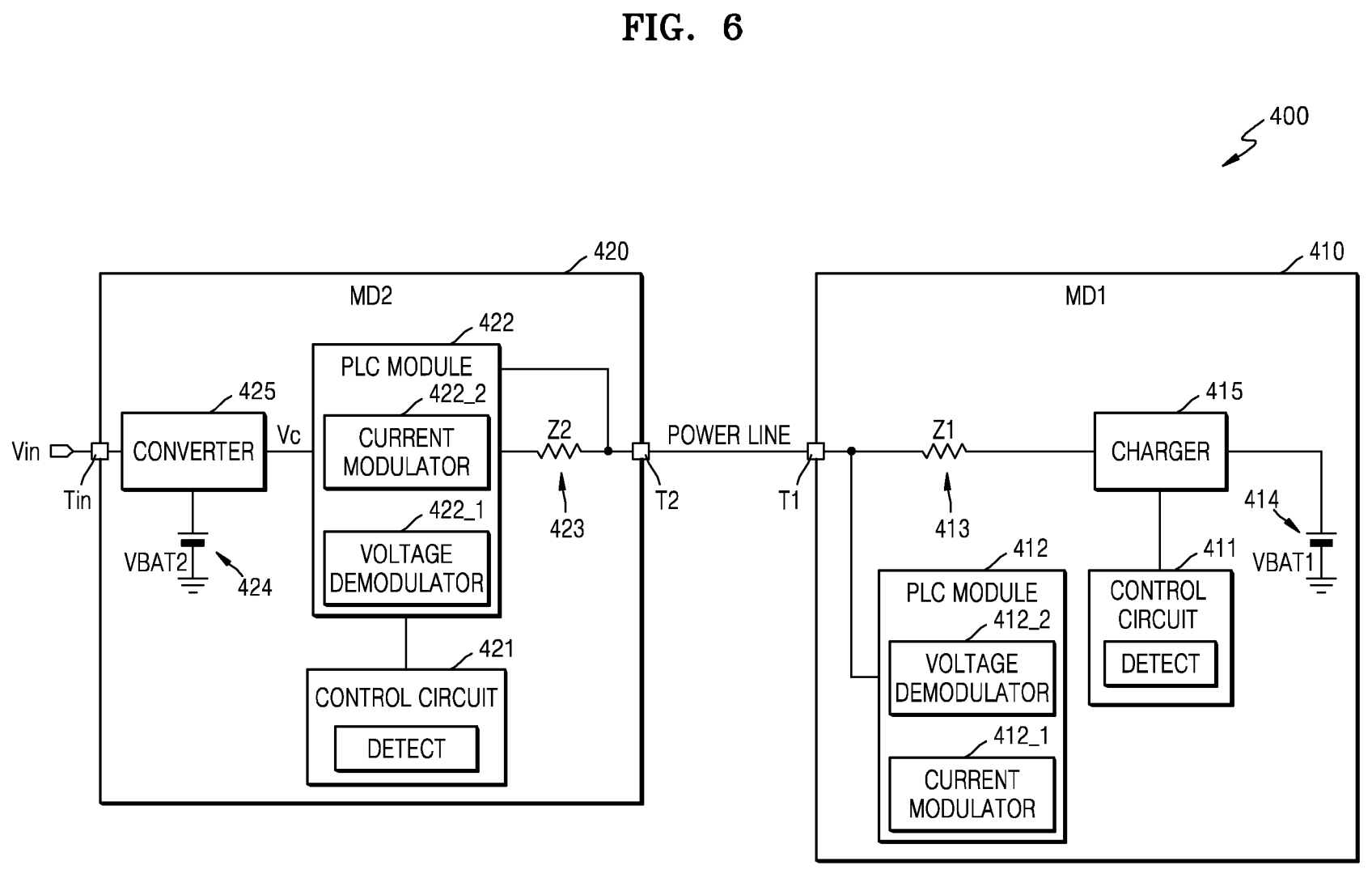

FIG. 6 is a block diagram illustrating a mobile system 400 according to embodiments of the inventive concept.

The mobile system 400 may include an MD1 410 and an MD2 420, and the MD1 410 may include a first connection terminal T1, an impedance circuit 413, a control circuit 411, a PLC module 412, a first battery 414, and a charger 415. The charger 415 may be a linear charger and may be implemented using a charging IC. The control circuit 411 may activate the charger 415 during a charging interval, and accordingly, the first battery 414 may be charged to a battery voltage VBAT1 using power received via a power line. In addition, during a data (reception) interval, the control circuit 411 may inactivate the charger 415, and the MD1 410 may operate using the battery voltage VBAT1 charged in the first battery 414. However, embodiments of the inventive concept are not limited thereto, and the foregoing operations may be variously performed. For example, the MD1 410 may be implemented such that the charging of the first battery 414 may also be performed in response to power received during a data (transmission) interval.

The MD2 420 may include a second connection terminal T2, an impedance circuit 423, a control circuit 421, a PLC module 422, a second battery 424, and a converter 425. The converter 425 may include a switching regulator configured to generate a conversion voltage Vc from an externally provided input voltage Vin applied to an input voltage terminal Tin or a battery voltage VBAT2 of the second battery 424. The converter 425 may be a DC-DC converter, and for example, the converter 425 may be a step-up converter (e.g., boost converter) configured to convert a low input voltage Vin or the battery voltage VBAT2 into a high conversion voltage Vc or a step-down converter (e.g., buck converter) configured to convert a high input voltage Vin or the battery voltage VBAT2 into a low conversion voltage Vc. In addition, the converter 425 may charge the second battery 424 to the battery voltage VBAT2 based on the input voltage Vin received from the outside.

The PLC module 412 in the MD1 410 may include a current modulator 412_1 and a voltage demodulator 412_2, and according to an embodiment of the inventive concept, the PLC module 412 may further include a current source (not shown). The current modulator 412_1 may receive a control signal from the control circuit 411 and perform current modulation according to the received control signal. The current source (not shown) may generate a current pulse according to the current modulation and provide the generated current pulse to the first connection terminal T1. The voltage demodulator 412_2 may demodulate a voltage signal received through the first connection terminal T1 and provide the demodulated internal signal to the control circuit 411.

The PLC module 422 in the MD2 420 may include a voltage modulator 422_1 and a current demodulator 422_2. The control circuit 421 may generate control signals for controlling the voltage modulator 422_1 and the current demodulator 422_2, and the voltage modulator 422_1 may receive a control signal from the control circuit 421 and modulate a voltage signal according to the received control signal. The voltage modulator 422_1 may transmit the generated voltage signal to the MD1 410 through the impedance circuit 423 and the second connection terminal T2. The voltage modulator 422_1 may include a linear regulator, e.g., a low drop-out (LDO) regulator. The current demodulator 422_2 may demodulate a current signal received through the second connection terminal T2 and provide the demodulated signal to the control circuit 422.

According to certain embodiments of the inventive concept, the MD1 410 and the MD2 420 may enter a preamble interval for setting a data period and a data determination timing before performing data communication. Here, one or more preamble signals may be communicated between the MD1 410 and the MD2 420. When the MD2 420 transmits data to the MD1 410, the MD2 420 may adjust a frequency and a duty of a preamble signal through a voltage modulation operation and transmit a preamble signal having a certain frequency and duty to the MD1 410. In addition, when the MD1 410 transmits data to the MD2 420, the MD1 410 may adjust a frequency and a duty of a preamble signal through a current modulation operation and transmit a preamble signal having a certain frequency and duty to the MD2 420.

Figure 7:
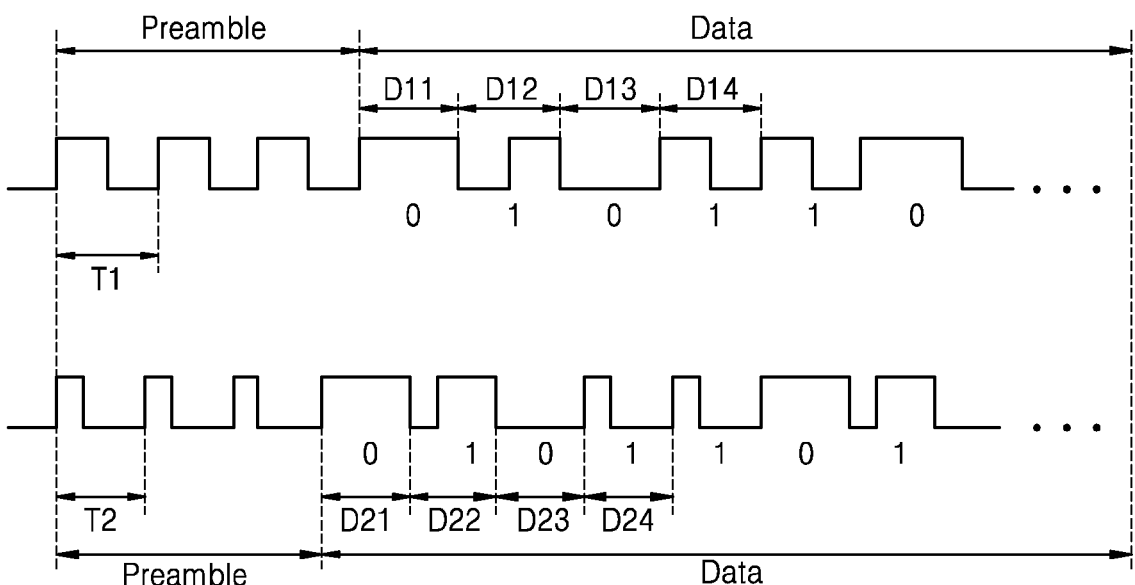
FIG. 7 is a waveform diagram illustrating in one example a signal received by a mobile device according to embodiments of the inventive concept.

FIG. 7 is a waveform diagram illustrating one example of a signal received by a mobile device according to embodiments of the inventive concept. Here again, the perspective of a data-receiving mobile device is assumed.

Referring to FIG. 7, the mobile device may receive a preamble signal and data, and analyze the preamble signal received in a first preamble interval to detect a frequency (or period) and a duty of the preamble signal. For example, the mobile device may determine that a data period corresponds to a first time T1, according to a detection result of the frequency of the preamble signal. In addition, based on the detected duty of the preamble signal, whether or not toggling occurs in the signal at a certain timing (or certain interval) within each data period may be used to determine the logical state of the data.

Data may be received during a data interval, wherein the period of the received data may correspond to the period of the preamble signal described above, and toggling in the voltage signal occurs (or it doesn't) according to a logical state of the data in each data period. For example, it may be determined that data D11 and D13 are "0" because no toggling occurs, and that data D12 and D14 are "1" because toggling occurs.

According to certain embodiments of the inventive concept, a level of a voltage signal received via a power line, regardless of the logical state of data as in the embodiment shown in FIG. 7 For example, the data D12 and D14 may have different levels of the voltage signal, but it may be determined that the data D12 and D14 are "1" because toggling occurs during a data period. However, embodiments of the inventive concept are not limited thereto, and a voltage modulation operation may be performed so that a voltage signal having the same level is transmitted when a logical state of data is same The mobile device may enter a second preamble interval and receive one or more preamble signals in the second preamble interval. FIG. 7 shows an example in which the frequency/duty of the preamble signal in the first preamble interval differs from a frequency/duty of the preamble signal in the second preamble interval, and it may be determined that a data period corresponds to a second time T2 according to the frequency detected in the second preamble interval.

Because the different frequency/duty of the preamble signal is detected, the mobile device may receive data at a different rate, and in addition, a timing at which it is determined whether toggling occurs in each data period may be differently set. For example, it may be determined that data D21 and D23 are "0" because no toggling occurs, and that data D22 and D24 are "1" because toggling occurs.

Figure 8:
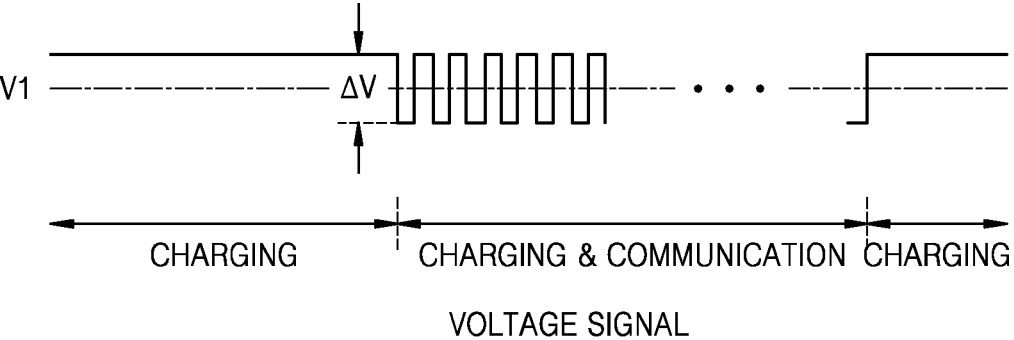
FIGS. 8 and 9 are respectively waveform diagrams illustrating a voltage signal and a current signal according to embodiments of the inventive concept.
Figure 9:
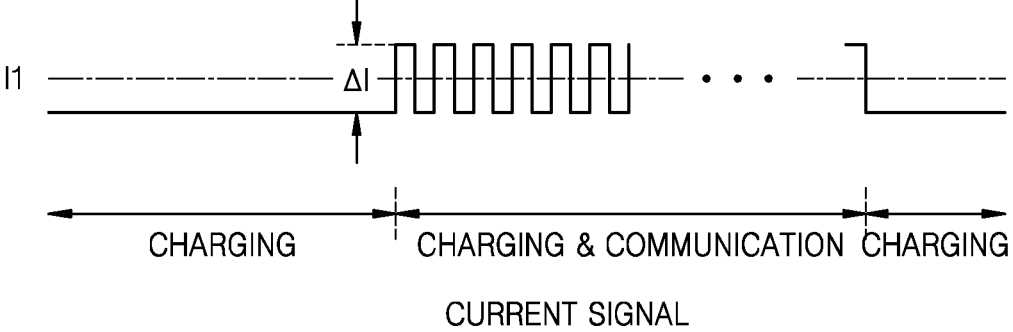

FIGS. 8 and 9 are respectively waveform diagrams illustrating a voltage signal and a current signal that may be communicated by certain embodiments of the inventive concept.

A mobile device may operate in various operation modes. For example, FIG. 8 illustrates operation in a charging mode and then a charging and communication mode. An MD1 which receives power may receive a voltage signal as data, and an MD2 which provides the power may provide a voltage signal having different waveforms according to operation modes.

A reference voltage V1 having a certain level is defined by a level greater or less by a certain value than a level in the charging mode, and for example, the MD2 may transmit a voltage signal having a fixed level greater by the certain value than the reference voltage V1 in the charging mode. Thereafter, in the charging and communication mode, the MD2 may transmit a voltage signal having a certain swing level to the MD1, and the swing level may have the same value in a preamble interval and a data transmission interval. In addition, a voltage difference ΔV of the swing level may be set to various values such as 200 mV, and when the charging mode is performed again, the MD2 may transmit a voltage signal having a level greater than that of the reference voltage V1.

Referring to FIG. 9, the MD1 may transmit data to the MD2 based on a current modulation operation. Here again, the charging mode followed by the charging and communication mode are illustrated. The MD1 may generate a reference current I1 at a level greater by a certain value than a charging current in the charging mode and corresponding to a change in the charging current. Thereafter, in the charging and communication mode, the MD1 may transmit a preamble signal and data to the MD2 by providing a current signal having a certain swing level to the MD2. In addition, a current difference ΔI of the swing level of the current signal may be set to various values such as 40 mA, and when the charging mode is performed again, the MD1 may transmit a current signal having a level lower than that of the reference current I1.

According to the embodiments of the inventive concept, a mobile device may perform both a charging operation and data communication without separating a charging interval and a data transmission interval. In addition, unless a level of a voltage signal and a current signal significantly fluctuate during the charging interval, there is a low probability of malfunction, such as one wherein a mobile device wrongly recognizes a preamble signal or data. Hence, the mobile device may stably communicate data through an appropriate swing level in the data transmission interval.

Figure 10:
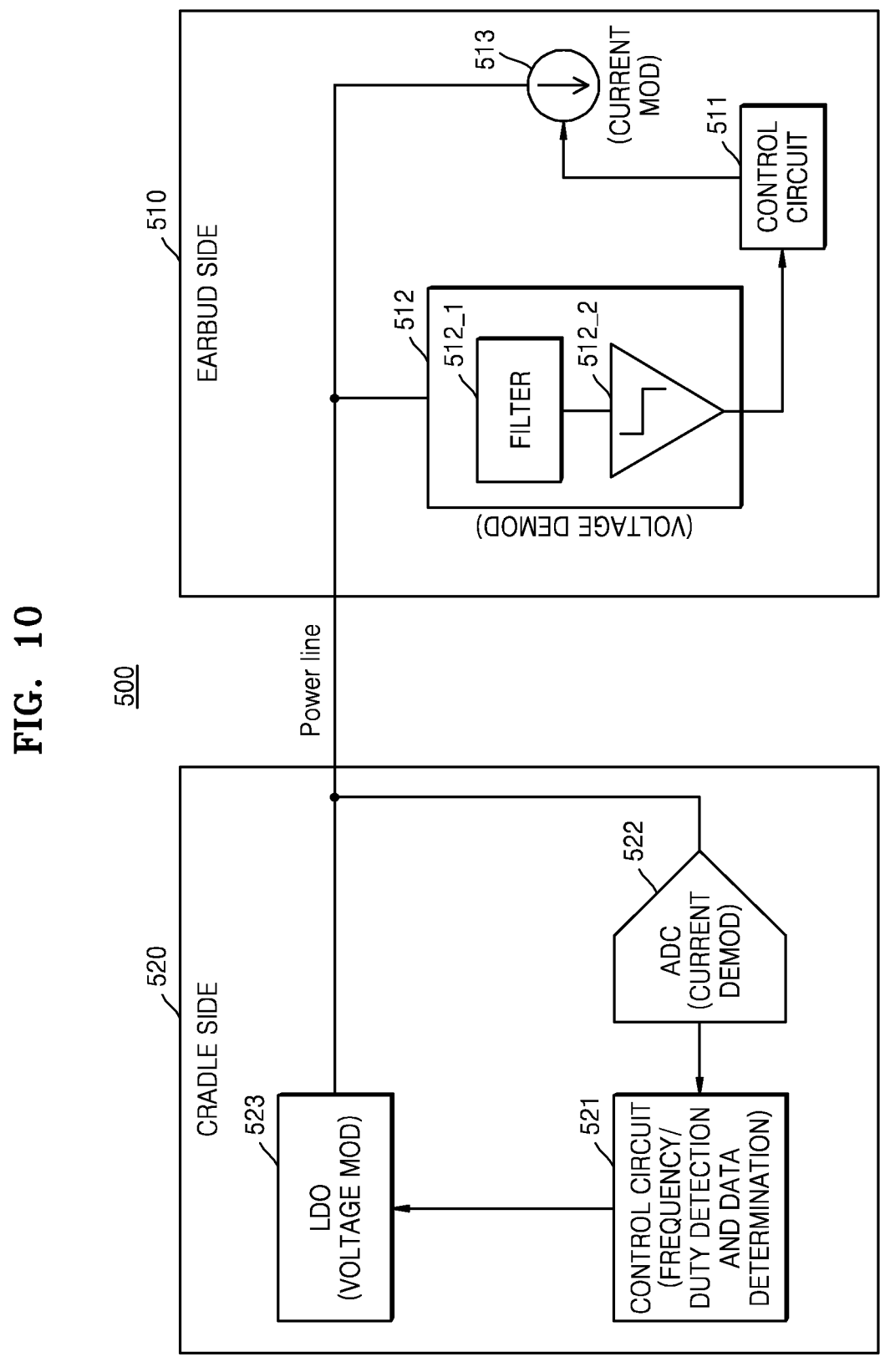
FIG. 10 is a block diagram illustrating in one example the detection of frequency and duty of a preamble signal according to embodiments of the inventive concept.

FIG. 10 is a block diagram further illustrating in one example the detection of a frequency and a duty of a preamble signal according to embodiments of the inventive concept.

Referring to FIG. 10, a mobile system 500 may include an MD1 510 and an MD2 520. Here, it is assumed that the MD1 510 receives a voltage signal as a preamble signal and data, and the MD2 520 receives a current signal as a preamble signal and data. According to an certain embodiments of the inventive concept, the MD1 510 may include a control circuit 511, a voltage demodulator 512, and a current modulator 513, wherein the voltage demodulator 512 includes a filter 512_1 and an amplifier 512_2. In addition, the current modulator 513 may include a current source.

The MD2 520 may include a control circuit 521, a current demodulator 522, and a voltage modulator 523, wherein the voltage modulator 523 includes an LDO, and the current demodulator 522 includes an analog-digital converter (ADC).

During operation of the MD1 510, the filter 512_1 in the voltage demodulator 512 may perform a filtering operation that removes noise by filtering a certain level of a voltage signal received through a power line and provide the filtered voltage signal to the amplifier 512_2. The amplifier 512_2 may generate an internal signal having a logical high or low level by processing the received voltage signal and provide the internal signal to the control circuit 511, and the control circuit 511 may perform a data determination operation by using the internal signal, based on a frequency and duty detection result according to the embodiments described above. In addition, the current circuit 511 may generate a current signal for data communication by controlling the current modulator 513.

During operation of the MD2, the current demodulator 522 may provide an internal signal having a logical high or a logical low to the control circuit 521 based on an ADC operation on the received current signal, and the control circuit 521 may perform a data determination operation based on a frequency/duty detected in a preamble interval. In addition, the control circuit 521 may generate a voltage signal for data communication according to the embodiments described above by controlling the voltage modulator 523.

Figure 11:
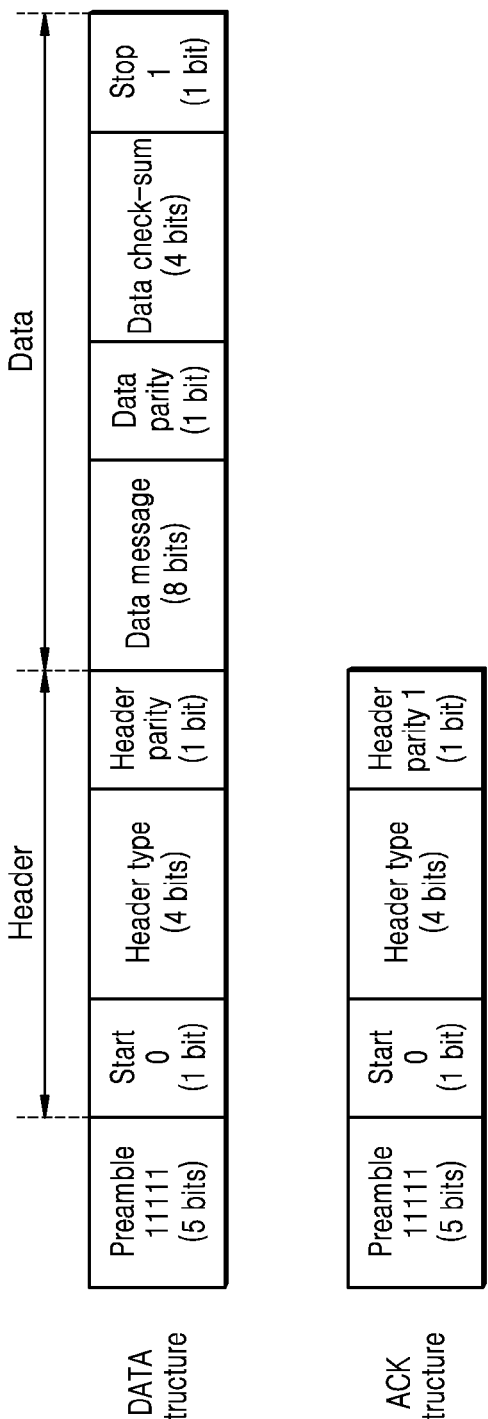
FIG. 11 is a conceptual diagram illustrating an exemplary data structure and acknowledgement signal that may be communicated between mobile devices according to embodiments of the inventive concept.

FIG. 11 is a conceptual diagram illustrating examples of a data structure and an acknowledgement signal that may be communicated between mobile devices according to embodiments of the inventive concept.

Referring to FIG. 11, data may be communicated based on transmission of a voltage signal or a current signal from a mobile device through a power line, and the data may include a plurality of fields. For example, the data may include a start field, a header type field, a header parity field, a data message field, a data parity field, a data check-sum field, and a stop field. The data structure shown in FIG. 11 is only illustrative, and the data structure may further include at least one other field, or at least one field among the field shown in FIG. 11 may be removed. In addition, FIG. 11 shows an example in which a preamble signal is transmitted before data having a certain structure is transmitted, and for example, a preamble interval has five intervals, all of logical values of the preamble signal are "1" because the preamble signal toggles in each interval.

The start field, the header type field, and the header parity field may correspond to header information, and the data message field, the data parity field, the data check-sum field, and the stop field may correspond to data information. For example, the start field may have a one-bit value and correspond to information indicating start of data transmission. In addition, the header type field may include one or more bits (e.g., four bits) and indicate a type of data transmitted, and the header parity field may include one bit and may be transmitted to determine the validity of the header information transmitted.

The data message field may include actual data having a plurality of bits, the data parity field may have a one-bit value and may be transmitted to determine the validity of the data. When the actual data transmitted has a more number of bits, a plurality of data message fields may be consecutively transmitted, or data of the structure shown in FIG. 11 may be consecutively transmitted a plurality of times. The data check-sum field may include a plurality of bits for data error detection, and the stop field may have a one-bit value to indicate stop of data transmission.

To increase the reliability of data transmission and reception, a mobile device which has received data may transmit an acknowledgement signal (ACK) having (e.g.,) a structure like the one shown in FIG. 11. The ACK may be transmitted one time following receipt of data, but embodiments of the inventive concept are not limited thereto, and ACK may be variously configured and communicated.

According to an embodiment of the inventive concept, ACK may have a shorter field structure than data. Through the structure, a time taken to transmit ACK may be reduced, and for example, ACK may include a start field, a header type field, and a header parity field. In addition, according to the embodiments described above, a preamble signal is transmitted before ACK is transmitted, and for example, a preamble interval has five intervals, all of logical values of the preamble signal are "1" because the preamble signal is toggled in each interval. In addition, the start field may have a one-bit value and correspond to information indicating start of transmission of ACK, the header type field may include one or more bits (e.g., four bits) and indicate a type of ACK transmitted, and the header parity field may include one bit and may be transmitted to determine the validity of the header information transmitted.

During the transmission and reception of data or ACK, one bit may be represented by indicating logical "1" when toggling occurs in one data period and logical "0" when no toggling occurs. In addition, because a preamble interval is a frequency and duty detection period of time, it is needed that a frequency and a duty do not vary in the preamble interval before data is transmitted and received.

Figure 12:
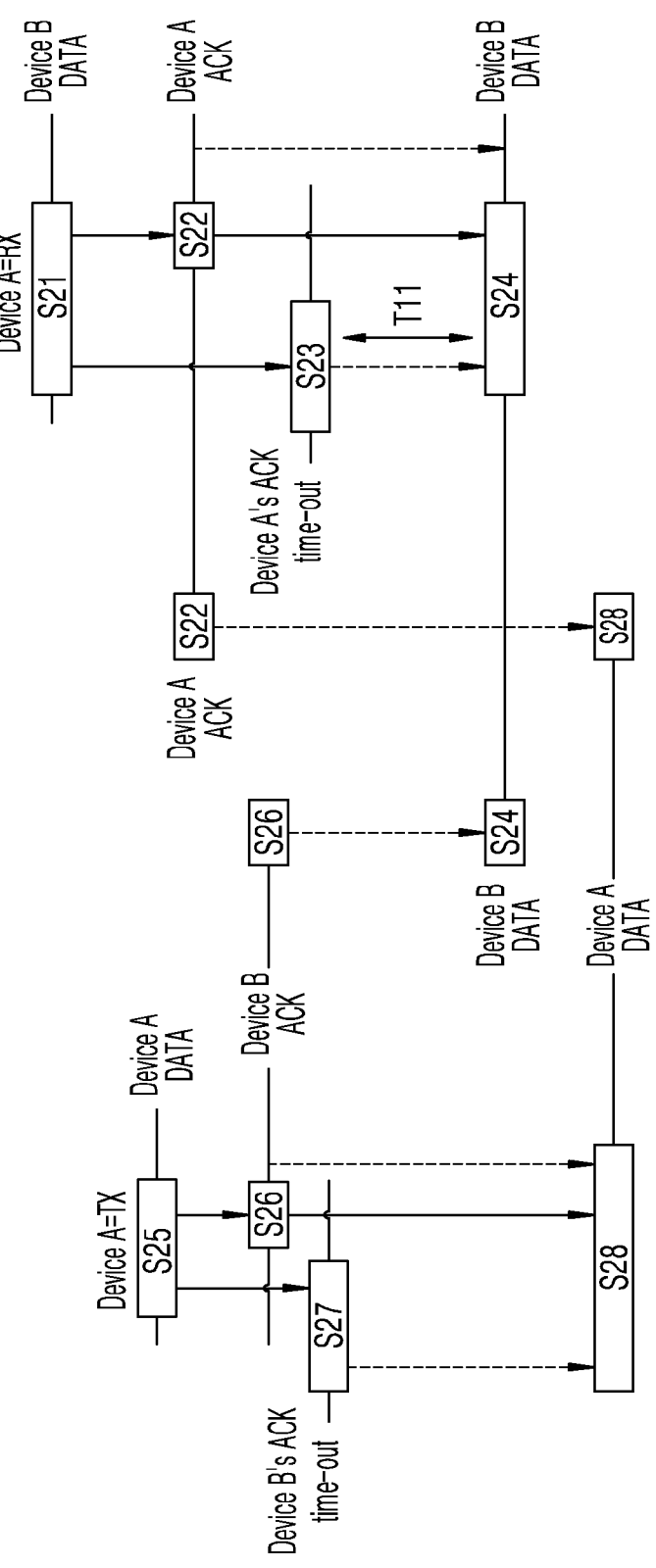
FIGS. 12 and 13 are respective flow diagram summarizing in a communication method according to embodiments of the inventive concept.
Figure 13:
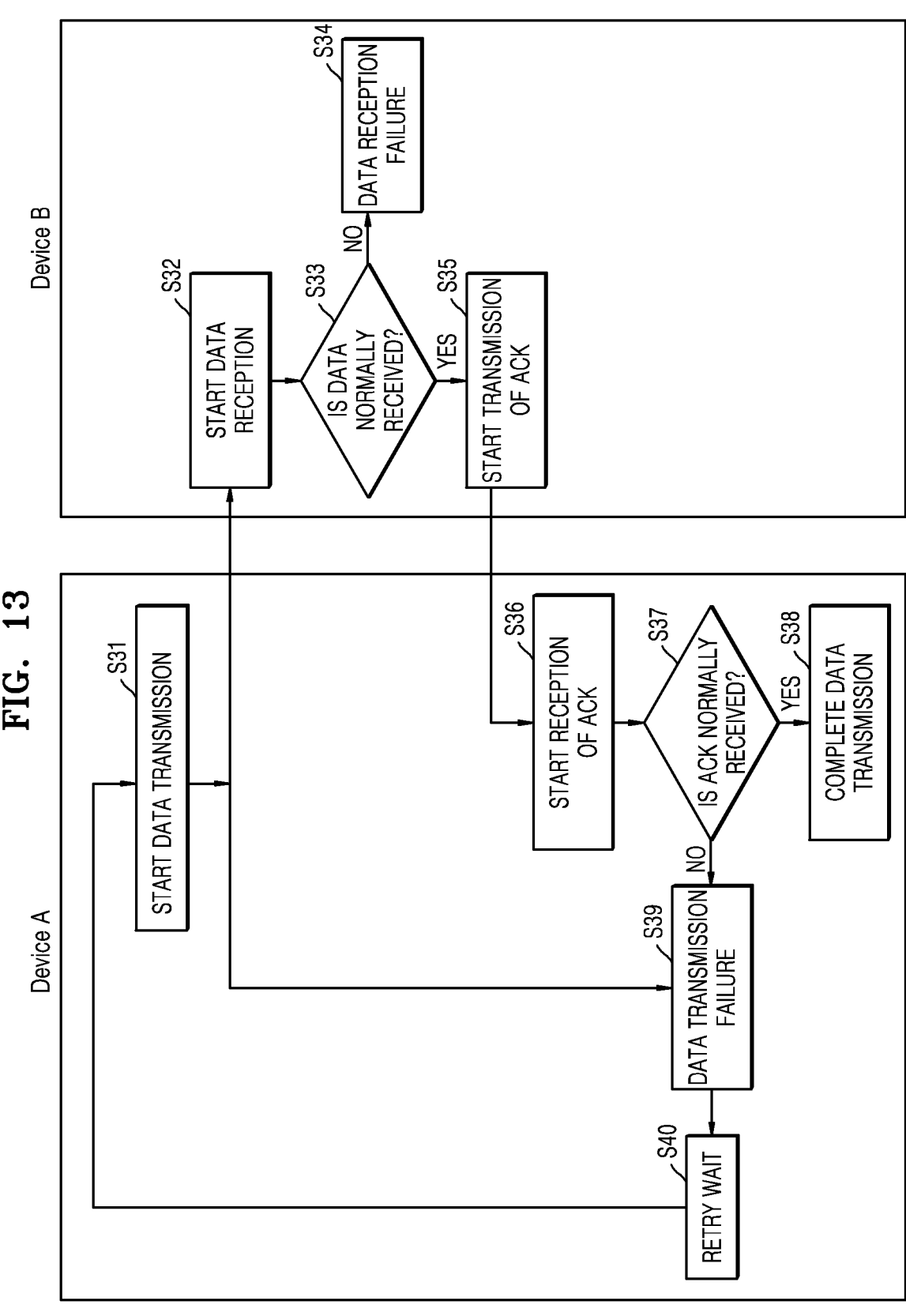

FIGS. 12 and 13 are flow diagram further illustrating a communication method according to embodiments of the inventive concept. The examples illustrated in FIGS. 12 and 13 assume bi-directional communication between mobile devices.

In a mobile system, because a mobile device may transmit one of a voltage signal and a current signal as data, and receive data as the other one of the voltage signal and the current signal, a communication operation between mobile devices may be bi-directionally performed. However, during a communication operation using a power line, signal stability may be limited. Accordingly, bi-directional communication may fail. When it is difficult to perform directional communication due to (e.g.,) external and/or internal noise associated with power delivery, by performing a sequence according to an embodiment of the inventive concept, bi-directional simultaneous communication may be detected and changed to sequential communication, thereby improving communication stability.

Referring to FIG. 12, operations shown in FIG. 12 may be sequentially performed in a top-down manner. When bi-directional simultaneous communication is performed, mobile devices may operate as a transmission device (TX) and a reception device (RX). Assuming that an MD1 (Device A) operates as a TX and an RX, when data is completely transmitted from an MD2 (Device B) in operation S21, Device A may transmit ACK in operation S22, and when ACK is completely transmitted in operation S22, Device B may transmit data in operation S24, or Device A transmit data in operation S28.

Otherwise, when data is not completely transmitted from Device B due to (e.g.,) noise in operation S21, Device A cannot transmit ACK in operation S22, and after a certain time elapses, the transmission of ACK of Device A in operation S22 may enter a time-out state in operation S23. In addition, after entering the time-out state in operation S23, when a first time T11 elapses, data transmission may be retried, and accordingly, after the first time T11 elapses, Device B may transmit data in operation S24.

Similarly, Device A may transmit data according to bi-directional communication in operation S25, and the data transmission of Device A in operation S25 may be simultaneously performed with the data transmission of Device B in operation S21. When Device A completely transmits data in operation S25, Device B may transmit ACK in operation S26, and when ACK is completely transmitted, Device B may transmit data in operation S24, or Device A transmits data in operation S28.

Otherwise, when data is not completely transmitted from Device A in operation S25, the transmission of ACK of Device B in operation S26 may enter a time-out state in operation S27. In addition, after entering the time-out state in operation S27, when a second time T12 elapses, data transmission may be retried, and accordingly, after the second time T12 elapses, Device A may transmit data in operation S28.

Herein, the first time T11 may be less than the second time T12, and accordingly, Device B may wait for a relatively short time and then retransmit data. However, Device A may wait for a relatively long time and then retransmit data. When the first time T11 is set to be very much less than the second time T12, a communication operation may be defined so that Device A enables data transmission after all data of Device B is transmitted when a failure occurs in bi-directional simultaneous communication. That is, according to an example embodiment of the inventive concept, by defining ACK and defining a time related to data retransmission after a time-out state, when a failure occurs in bi-directional communication, the communication operation may be changed to a sequential operation, thereby improving data stability.

For example, when Device A corresponds to a wireless earbud charger and Device B corresponds to wireless earbuds, Device B may receive significant data (e.g., firmware) through communication (e.g., wireless communication such as Bluetooth) with a host, and it is needed to transmit the received data to Device A. In this case, Device A may transmit data to Device B at the same time as the data reception, and through the communication operation regulation according to an embodiment of the inventive concept, communication may be performed so that significant data from Device B is first transmitted to Device A.

FIG. 13 is a flow diagram further illustrating in one example operation of a mobile system which may be performed according to the embodiment of FIG. 12. In FIG. 13, it is assumed that Device A corresponds to a wireless earbud charger and Device B corresponds to wireless earbuds.

Device A may start data transmission in operation S31, Device B may start data reception in operation S32, and Device B may determine in operation S33 whether all data is normally received. When data is not normally received, Device B may determine in operation S34 that data reception fails.

Otherwise, when Device B normally receives data, Device B may start transmission of ACK in operation S35, and Device A may start reception of ACK in operation S36. Device A may determine in operation S37 whether ACK is normally received, and when ACK is normally received, Device A may determine in operation S38 that the data transmission of Device A is completed.

Otherwise, when ACK is not normally received, Device A may determine in operation S39 that the data transmission has failed, perform a wait operation for a certain time for retry in operation S40, and start a data transmission operation again in operation S31 after the certain time elapses.

According to the embodiment described above, Device B may determine a data reception failure in operation S34 when data from Device A is not normally received, and transmit data to Device A without a separate waiting time or after a short waiting time after the determination. However, Device A may perform a retransmission operation after waiting a relatively long time when ACK is not normally received, and accordingly, Device B may have a higher priority in data transmission. The communication operation described above may be applied to all communication cases or particular communication cases and, for example, selectively applied to a communication case for delivering significant information such as firmware from a host.

According to the example embodiments of the inventive concept, ACK exists in a data structure, and ACK may have a short field structure shorter than that of data to improve a data transmission and reception rate.

In addition, according to the example embodiments of the inventive concept, a preamble interval may exist, a preamble signal may include a plurality of bits (e.g., three or more bits), and a mobile device which may be a transmission device or a reception device may have (or generate) a clock signal faster than a frequency of a preamble signal (or data signal) to detect the frequency or a duty of the preamble signal. In addition, a mobile device which is a power supply source may modulate data through a voltage (or voltage swing) and perform a demodulation operation on received data by using a current. However, a mobile device which receives power may modulate data through a current (or current swing) and perform a demodulation operation on received data by using a voltage.

According to an embodiment of the inventive concept, bi-directional simultaneous communication may be performed based on a PLC operation, and when the bi-directional simultaneous communication cannot be performed, a retry time may be set through a data modulation/demodulation flow, and for example, a retry time of a mobile device which transmits significant information such as firmware may be less than a retry time of a mobile device which receives the information.

While the inventive concept has been particularly shown and described with reference to embodiments thereof, it will be understood that various changes in form and details may be made therein without departing from the spirit and scope of the following claims.

What is claimed is:

1. A mobile device comprising:
a power line communication (PLC) module configured to communicate data with an external device via a power line, receive a first preamble signal from the external device during a first preamble interval, receive a first voltage signal during a first data reception interval following the first preamble interval, and demodulate the first voltage signal to provide a demodulated voltage signal;
a frequency/duty detector configured to detect a frequency and a duty of the first preamble signal, and provide a first detected frequency and a first detected duty for interpreting bits of data to be received, wherein a timing for determining a logical state of the data varies as a detected duty varies; and
a control circuit configured to perform a data determination operation on the demodulated voltage signal using the first detected frequency and the first detected duty;

wherein the frequency/duty detector is further configured to receive a clock signal internally generated by the mobile device, and detect the frequency and the duty of the first preamble signal using the clock signal to provide the first detected frequency and the first detected duty,
wherein a frequency of the clock signal is greater than the first detected frequency,
wherein the PLC module is configured to receive a second preamble signal from the external device during a second preamble interval and receive a second voltage signal during a second data reception interval following the second preamble interval, and
wherein, based on the frequency/duty detector determining that the frequency and the duty of the first preamble signal are different from the frequency and the duty of the second preamble signal, the frequency/duty detector is configured to detect that a data reception frequency in the first data reception interval is different from a data reception frequency in the second data reception interval and to determine that a timing of a logical state of the data in a single data period in the first data reception interval is different from a logical state of the data in the second data reception interval.

2. The mobile device of claim 1, wherein the first preamble signal includes a plurality of preamble signals.

3. The mobile device of claim 2, wherein the plurality of preamble signals have same frequency and same duty.

4. The mobile device of claim 1, wherein the PLC module is further configured to transmit a third preamble signal to the external device during a third preamble interval and transmit data to the external device by modulating a current signal during a data transmission interval following the third preamble interval.

5. The mobile device of claim 1,
wherein the frequency/duty detector is further configured to detect a frequency and a duty of the second preamble signal, provide a second detected frequency and a second detected duty, and perform a data determination operation at a rate corresponding to the second detected frequency and at a timing corresponding to the second detected duty.

6. The mobile device of claim 1, further comprising:
an impedance circuit connected to the power line through a first terminal of the mobile device; and
a charging circuit configured to control a charging operation for a battery using power received via the power line.

7. The mobile device of claim 1,
wherein the mobile device is an earbud including a battery configured to provide power to components within the mobile device, and
wherein the external device is a charger configured to provide charging power to the mobile device.

8. A mobile device comprising:
a power line communication (PLC) module configured to communicate data with an external device via a power line, receive a first preamble signal from the external device during a preamble interval, and receive the data during a first data reception interval following the preamble interval;
a frequency/duty detector configured to detect a frequency and a duty of the first preamble signal and provide a detected frequency and a detected duty for interpreting bits of data to be received, wherein a timing for determining a logical state of the data varies as a detected duty varies; and a control circuit configured to determine the data received from the external device using at least one of the detected frequency and the detected duty, wherein the PLC module is further configured to receive the data in a data period having a rate corresponding to the detected frequency, wherein the control circuit is further configured to determine a logical state of the data at a timing corresponding to the detected duty in every data period, wherein, as the duty of the first preamble signal varies, the timing of determining the logical state of the data varies within the every data period, wherein the PLC module is configured to receive a second preamble signal from the external device during a second preamble interval and receive a voltage signal during a second data reception interval following the second preamble interval, and wherein, based on the frequency/duty detector determining that the frequency and the duty of the first preamble signal are different from the frequency and the duty of the second preamble signal, the frequency/duty detector is configured to detect that a data reception frequency in the first data reception interval is different from a data reception frequency in the second data reception interval and to determine that a timing of a logical state of the data in a single data period in the first data reception interval is different from a logical state of the data in the second data reception interval.

9. The mobile device of claim 8, wherein the mobile device is configured to transmit a data transmission acknowledgement signal to the external device in response to data received from the external device, and wherein a field structure of the data transmission acknowledgement signal is shorter than a field structure of the data received from the external device.

10. The mobile device of claim 9, wherein the field structure of the data transmission acknowledgement signal includes a start field having a one-bit, a header type field having four bits, and a header parity field having a one-bit.

11. The mobile device of claim 9, wherein the mobile device is configured to perform bi-directional data communication with the external device, wherein the mobile device is further configured to enter a time-out state when the data transmission acknowledgement signal is not received from the external device, and to retry data transmission to the external device when a first waiting time elapses following the time-out state, and wherein the first waiting time is set to be less than a second waiting time set for data retransmission by the external device following a time-out state of the external device.

12. The mobile device of claim 11, wherein, based upon a failure occurring in the bi-directional data communication, the mobile device is further configured to re-transmit data first to the external device and to receive data from the external device after re-transmitting of all data is completed.

13. The mobile device of claim 8, wherein the preamble interval includes a plurality of intervals, and the first preamble signal is received in each one of the plurality of intervals with same frequency and same duty.

14. The mobile device of claim 8, wherein the PLC module comprises:

a voltage demodulator configured to demodulate a voltage signal received as the data during the first data reception interval; and a current modulator configured to transmit data to the external device by modulating a current signal during a data transmission interval.

15. The mobile device of claim 8, further comprising:

a current demodulator configured to demodulate a current signal received as the data in the first data reception interval; and a voltage modulator configured to transmit data to the external device by modulating a voltage signal in a data transmission interval.

16. An operating method of a mobile device communicating data with an external device via a power line, the operating method comprising:

receiving a plurality of first preamble signals respectively transmitted in a plurality of intervals of a first preamble interval from the external device via the power line;

detecting a frequency and a duty of the plurality of first preamble signals to provide a first detected frequency and a first detected duty for interpreting bits of data to be received, wherein a timing for determining a logical state of the data varies as a detected duty varies based on the received plurality of first preamble signals;

receiving first data from the external device during a first data reception interval; and determining the first data according to a first data period corresponding to the first detected frequency and a timing corresponding to the first detected duty, wherein, as the duty of the plurality of first preamble signals varies, a timing of determining a logical state of the first data varies within a single data period;

receiving a plurality of second preamble signals from the external device during a second preamble interval; and receiving a voltage signal during a second data reception interval following the second preamble interval, based on the frequency and duty of the first preamble signals being different from the frequency and the duty of the second preamble signals, determining that a data reception frequency in a first data reception interval is different from a data reception frequency in the second data reception interval, and determining that a timing of determining a logical state of the data in a single data period in the first data reception interval is different from a logical state of the data in the second data reception interval.

17. The operating method of claim 16, wherein the plurality of first preamble signals have same frequency and same duty, and the first detected frequency and the first detected duty correspond to the frequency and the duty of each first preamble signal.

18. The operating method of claim 16, wherein at least one of the frequency and the duty of the plurality of first preamble signals is different from each other, and the first detected frequency and the first detected duty are determined by calculating average values of frequencies and duties of the plurality of first preamble signals.

19. The mobile device of claim 1, wherein the mobile device is configured to switch transmission with the external device from bi-directional simultaneous data communication to sequential data communication based on an occurrence of a failure in the bi-directional simultaneous data communication.

* * * * *